No. 793,275. Patented June 27, 1905.

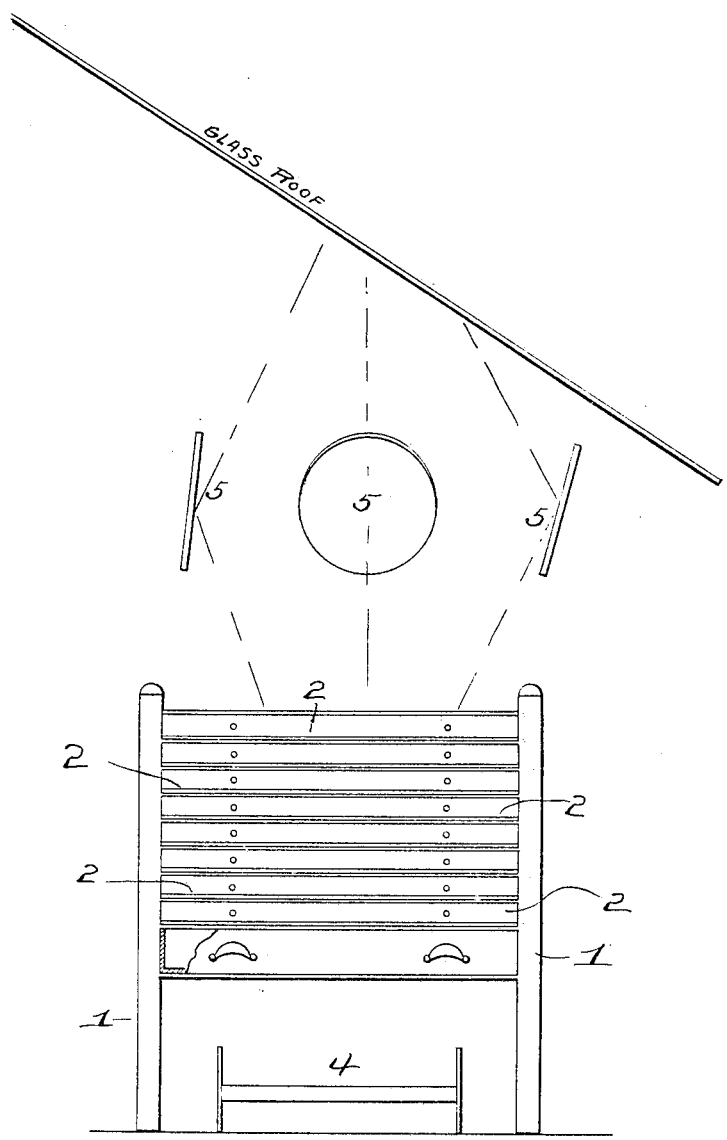

UNITED STATES PATENT OFFICE.

IRA A. CAIN, OF LOMPOC, CALIFORNIA.

SOLAR GERMICIDE.

SPECIFICATION forming part of Letters Patent No. 793,275, dated June 27, 1905.

Application filed July 28, 1903. Serial No. 167,306.

*To all whom it may concern:*

Be it known that I, IRA A. CAIN, a resident of Lompoc, in the county of Santa Barbara and State of California, have invented certain new and useful Improvements in Solar Germicides; and I do hereby declare the following to be a full, clear, and exact description of the invention, such as will enable others skilled in the art to which it appertains to make and use the same.

My invention relates to an improved solar germicide, the object of the invention being to provide an improved apparatus of this character for utilizing the sun's rays at the proper temperature for the treatment of lupus, cholera, typhoid fever, scarlet fever, consumption, diphtheria, cancer, and any and all diseases having bacilla, bacteria, or any other form of germ, and for the treatment of any and all diseases where solar light is used, and my improvements are also adapted for use in any sick room or compartment to improve hygienic conditions.

With these objects in view the invention consists in certain novel features of construction and combinations and arrangements of parts, as will be more fully hereinafter described, and pointed out in the claims.

The accompanying drawing is a view in elevation, illustrating one form of my improvements.

1 represents a frame or standards spaced apart and providing supports for slides 2. These slides 2 contain sheets of glass, which may be of various colors and thickness and can be interchanged or removed at will. Below the glass slides 2 a drawer or receptacle having a glass bottom is located and is adapted to contain water or other liquid through which the sun's rays must pass and be cooled before reaching the patient below, and I have shown a cot or bed 4 to receive the patient, although a chair or other support may be provided in accordance with the disease under treatment. The frame 1 is located beneath a glass roof or skylight, and any suitable accumulators 5 may be provided to collect the sun's rays and center them on the upper glass slide 2. These slides 2 may be all white or colored, as may be used for certain diseases, any color being given the rays of light by the proper assemblage of slides. I might dispense with the cooling-bath or the series of glass slides, as both perform the cooling action of the sun's rays. However, I prefer to use both, as I believe the operation of the apparatus is best performed thereby.

My improved arrangement of glass slides and cooling-bath may be variously constructed and arranged in accordance with varying conditions, and various different forms of accumulators may be employed, and hence I do not restrict myself to the precise details set forth, but consider myself at liberty to make such slight changes and alterations as fairly fall within the spirit and scope of my invention.

Having fully described my invention, what I claim as new, and desire to secure by Letters Patent, is—

1. A solar germicide, comprising a frame, a transparent slide therein, a transparent liquid-receptacle below the same and means for directing sun's rays through said slide and liquid to the body of a patient.

2. A solar germicide, comprising a frame, a series of transparent slides therein, and a liquid-receptacle or slide below the same and having a transparent bottom, means under said transparent bottom for the accommodation of a patient and means for directing sun's rays through said slides and liquid-receptacle to a patient under the same.

3. A solar germicide, comprising a frame, a series of glass slides therein, a liquid-receptacle below the slides having a glass bottom, and accummulators disposed to collect the solar light and direct it through the slides and liquid-receptacle to the body of a patient.

In testimony whereof I have signed this specification in the presence of two subscribing witnesses.

IRA A. CAIN.

Witnesses:
  LAURA M. REDDEN,
  ANNE M. REDDEN.